US009961221B2

(12) United States Patent
Sato

(10) Patent No.: US 9,961,221 B2
(45) Date of Patent: May 1, 2018

(54) MOTOR CONTROL APPARATUS THAT CONTROLS MOTOR BASED ON RESULT OF DETECTION BY POSITION DETECTION SENSOR THAT DETECTS ROTATIONAL POSITION OF ROTOR OF MOTOR, AND IMAGE FORMING APPARATUS

(71) Applicant: CANON KABUSHIKI KAISHA, Tokyo (JP)

(72) Inventor: Hiroki Sato, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/278,217

(22) Filed: Sep. 28, 2016

(65) Prior Publication Data
US 2017/0111529 A1    Apr. 20, 2017

(30) Foreign Application Priority Data

Oct. 16, 2015 (JP) ................................ 2015-204673
Sep. 6, 2016 (JP) ................................ 2016-174003

(51) Int. Cl.
*H04N 1/00* (2006.01)
*H04N 1/06* (2006.01)
*H02P 8/14* (2006.01)
*B65H 5/06* (2006.01)

(52) U.S. Cl.
CPC ........... *H04N 1/00652* (2013.01); *H02P 8/14* (2013.01); *H04N 1/00602* (2013.01); *H04N 1/06* (2013.01); *B65H 5/06* (2013.01); *H04N 2201/0082* (2013.01)

(58) Field of Classification Search
CPC .................................................. H04N 1/00652
USPC .............................................. 358/1.14, 1.15
See application file for complete search history.

(56) References Cited

U.S. PATENT DOCUMENTS

| 6,850,027 | B2 | 2/2005 | Kuwano et al. | |
|---|---|---|---|---|
| 2002/0125847 | A1* | 9/2002 | Shimoyama | G05B 19/19 318/560 |
| 2013/0078021 | A1* | 3/2013 | Sakamoto | G05B 11/18 399/361 |
| 2015/0214875 | A1* | 7/2015 | Matsui | H02P 6/147 318/400.13 |

FOREIGN PATENT DOCUMENTS

| JP | H06-225595 A | 8/1994 |
|---|---|---|
| JP | 3661864 B | 6/2005 |

* cited by examiner

*Primary Examiner* — Jacky X Zheng
(74) *Attorney, Agent, or Firm* — Fitzpatrick, Cella, Harper & Scinto

(57) ABSTRACT

A motor control unit performs driving control for a stepping motor by using vector control, and detects a rotational position θ of a rotor of the stepping motor, the rotational position θ being required for vector control, by using a position detection unit, based on a pulse signal that is output from an encoder. The motor control unit determines whether or not there is an abnormality in the pulse signal output from the encoder. Upon determining that there is an abnormality in the pulse signal, the motor control unit corrects a detection value of the position θ of the rotor of the stepping motor so as to compensate an error caused by the abnormality in the pulse signal.

15 Claims, 11 Drawing Sheets

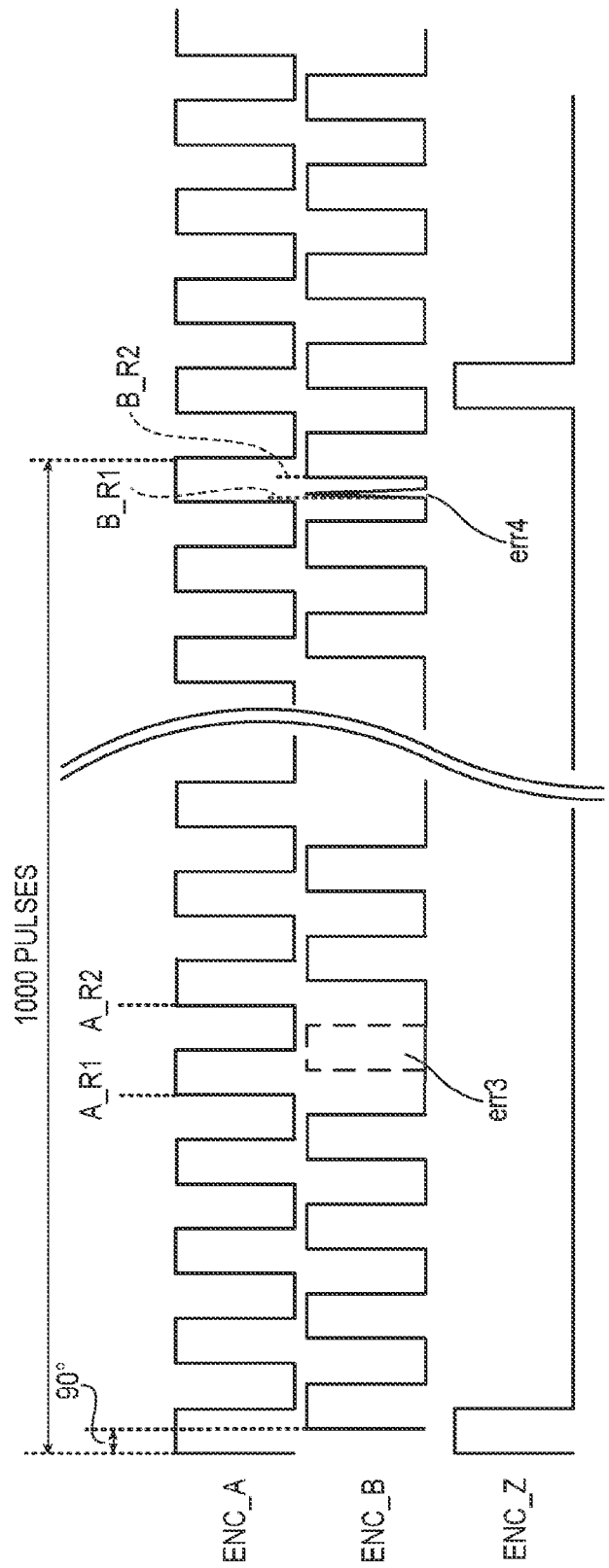

MOTOR CONTROL APPARATUS THAT CONTROLS MOTOR BASED ON RESULT OF DETECTION BY POSITION DETECTION SENSOR THAT DETECTS ROTATIONAL POSITION OF ROTOR OF MOTOR, AND IMAGE FORMING APPARATUS

BACKGROUND OF THE INVENTION

Field of the Invention

The present invention relates to driving control for motors, and in particular to driving control for a motor such as a stepping motor that can be used as a driving source of a load included in an image forming apparatus such as copiers or printers.

Description of the Related Art

In electrophotographic imaging forming apparatuses such as copiers and printers, stepping motors are widely used as a driving source of a conveyance system that conveys recording materials such as sheets of paper on which images are to be formed. A stepping motor is capable of performing speed control by controlling the period of a pulse signal that is provided to the motor, even if the motor is not provided with a mechanism for detecting the rotation speed of the rotor of the motor. Also, a stepping motor is capable of performing position control by controlling the number of pulses that are provided to the motor, even if the motor is not provided with a mechanism for detecting the rotational position of the rotor of the motor. These control methods are generally called "synchronization control". However, if the load torque applied to the rotor of the stepping motor exceeds the output torque that corresponds to the driving current supplied to the windings of the motor during the synchronization control for the stepping motor, the stepping motor enters a step-out state in which the stepping motor is not in synchronization with input pulses and is uncontrollable. When the motor is in the step-out state, it is not possible to appropriately convey the recording materials and a paper jam may occur. Consequently, it becomes necessary to have a user remove the jammed paper from the inside of the image forming apparatus. In order to avoid such a situation, it is necessary to supply the windings of the motor with a current obtained by adding a predetermined margin to the driving current corresponding to the load torque required by the apparatus, so that the motor does not enter the step-out state. Consequently, there are problems in which the amount of power consumption increases, and motor noise increases due to excessive torque.

To address such problems, a method called "vector control" (or "field oriented control (FOC)") has been proposed as disclosed in U.S. Pat. No. 6,850,027 and Japanese Patent Laid-Open No. 6-225595. Vector control is a method for controlling the amplitude and the phase of the driving current so that an appropriate torque is generated in the rotor of the motor, using a rotating coordinate system in which the direction of magnetic flux of the rotor is defined as a d-axis and the direction that is orthogonal to the aforementioned direction is defined as a q-axis. In the rotating coordinate system, the q-axis component (the q-axis current) of the driving current is a torque current component that causes the motor to generate torque, and the d-axis component (the d-axis current) of the driving current is an excitation current component that affects the magnetic flux strength of the rotor of the motor. Even if the load torque applied to the rotor of the motor changes, the motor control apparatus is capable of efficiently generating the torque required for the rotor to rotate, by controlling the q-axis current according to changes in the load torque. Consequently, it is possible to prevent the motor from entering the step-out state. It is also possible to prevent the power consumption from increasing, and to prevent motor noise from increasing due to excessive torque. In vector control, it is necessary to detect the rotational position of the rotor, using a position detection sensor such as a rotary encoder.

In the above-described vector control, the result of detection by the encoder, of the rotational position of the rotor, is used not only for rotor of the motor speed control and rotor of the motor position control, but also for controlling the driving current (the d-axis current and the q-axis current) in the rotating coordinate system. However, if the encoder becomes dirty due to toner used in the image forming apparatus or paper dust from recording paper for example, some sort of abnormality such as a missing pulse might occur in the pulse signal output from the encoder. If an abnormality occurs in the pulse signal, an error occurs in the rotational position of the rotor determined based on the pulse signal. If an error occurs in the determined rotational position of the rotor, the rotation speed of the motor becomes less stable, and there is the possibility of the motor entering an uncontrollable state.

SUMMARY OF THE INVENTION

The present invention has been made in view of the above-described problems. The present invention, which is applicable to a motor control apparatus that performs driving control for a motor by using vector control, provides technology for continuing the vector control when an abnormality occurs in a signal output from a position detection sensor that detects the rotational position of the motor.

According to one aspect of the present invention, there is provided a motor control apparatus that performs driving control for a motor based on a designated position indicating a target position of a rotor of the motor, comprising: a motor driving unit configured to drive the motor by controlling a driving current that is to be supplied to a winding of the motor, based on a current value in a rotating coordinate system defined with a rotational position of the rotor of the motor as a reference; a position determination unit configured to determine the rotational position of the rotor based on a pulse signal that is output from a position detection sensor, which is provided in the motor, according to a change in the rotational position of the rotor; and a determination unit configured to determine whether or not there is an abnormality in the pulse signal output from the position detection sensor, wherein the position determination unit is configured to, if there is an abnormality in the pulse signal, determine the rotational position of the rotor by correcting the rotational position that is based on the pulse signal, and wherein the motor driving unit is configured to drive the motor by controlling the driving current that is to be supplied to the winding of the motor such that a deviation between the rotational position of the rotor determined by the position determination unit and the designated position approaches 0.

According to another aspect of the present invention, there is provided an image forming apparatus comprising: an image forming unit configured to form an image on a recording material; a motor configured to drive a roller that conveys the recording material; a motor driving unit configured to drive the motor by controlling a driving current that is to be supplied to a winding of the motor based on a current value in a rotating coordinate system defined with a rotational position of the rotor of the motor as a reference; a position determination unit configured to determine the rotational position of the rotor based on a pulse signal that is output from a position detection sensor, which is provided in the motor, according to a change in the rotational position of the rotor; and a determination unit configured to determine whether or not there is an abnormality in the pulse signal output from the position detection sensor, wherein the position determination unit is configured to, if there is an abnormality in the pulse signal, determine the rotational position of the rotor by correcting the rotational position that is based on the pulse signal, and wherein the motor driving unit is configured to drive the motor by controlling the driving current that is to be supplied to the winding of the motor such that a deviation between the rotational position of the rotor determined by the position determination unit and a designated position that indicates a target position of the rotor and that is provided from the master controller approaches 0.

The present invention, which is applicable to a motor control apparatus that performs driving control for a motor by using vector control, makes it possible to continue the vector control when an abnormality occurs in an output signal from a position detection sensor that detects the rotational position of the motor. Consequently, it is possible to realize efficient motor driving control using vector control without bringing the motor into an uncontrollable state.

Further features of the present invention will become apparent from the following description of exemplary embodiments (with reference to the attached drawings).

BRIEF DESCRIPTION OF THE DRAWINGS

FIG. 11 is a diagram showing an example of a pulse signal output from the encoder.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Image Forming Apparatus>

Figure 1:
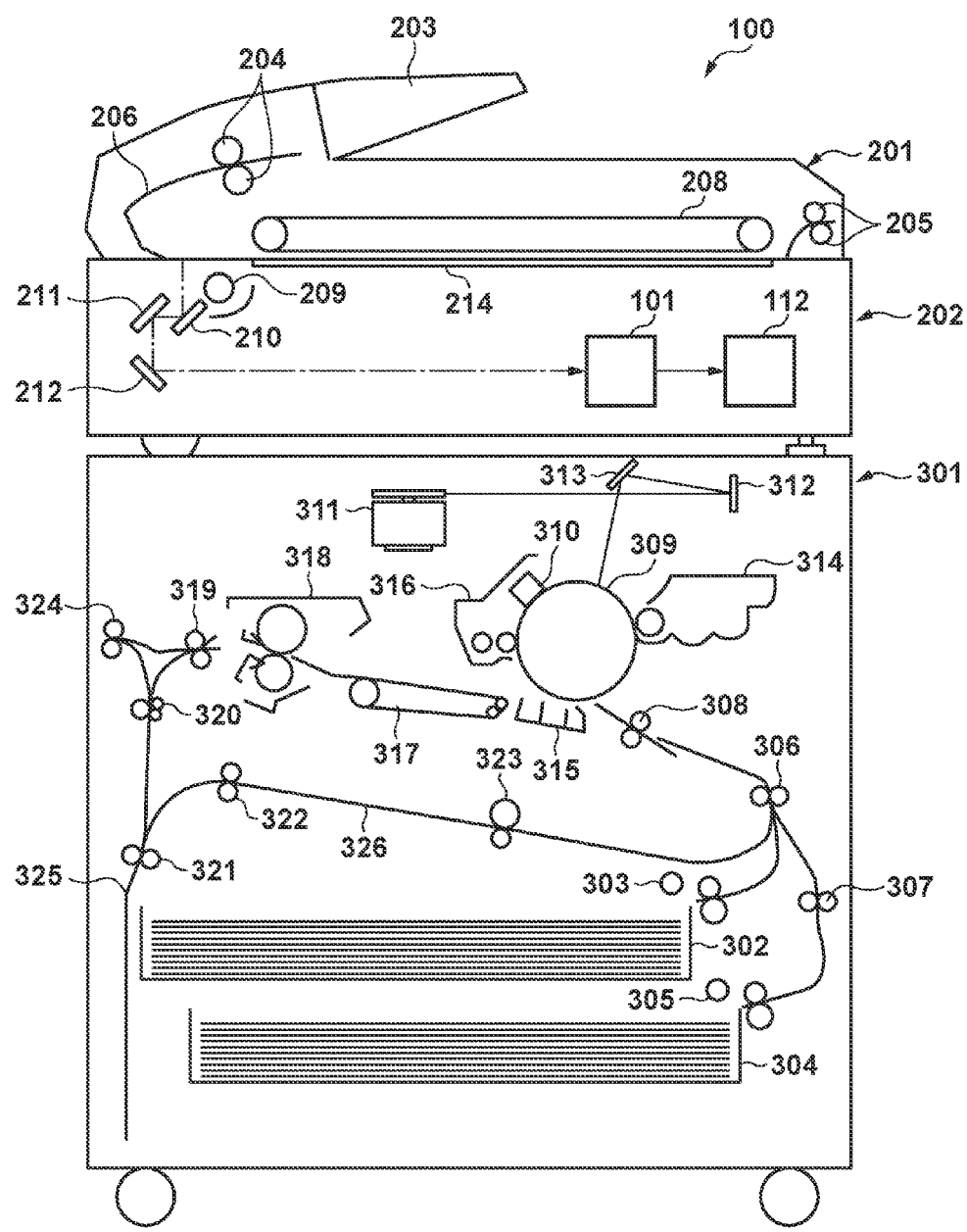
FIG. 1 is a diagram showing an example of an overall configuration of an image forming apparatus.

First, with reference to FIG. 1, a description is given of an example of a configuration of an image forming apparatus to which a motor control apparatus according to an embodiment of the present invention is installed. An image forming apparatus 100 shown in FIG. 1 includes an automatic document feeder apparatus 201, a reader apparatus 202, and an image forming apparatus main body 301.

Documents placed on a document placement unit 203 of the automatic document feeder apparatus 201 are fed one by one by a paper feeding roller 204, and are conveyed to a document glass platen 214 of the reader apparatus 202 via a conveyance guide 206. Furthermore, the documents are conveyed by a conveyance belt 208 at a constant speed, and are thereafter discharged by a discharge roller 205 to the outside of the apparatus. During these processes, reflected light from an image on a document that is illuminated at a reading position of the reader apparatus 202 by an illumination system 209 is guided to an image reader unit 101 by an optical system constituted by reflection mirrors 210, 211, and 212, and is converted into an image signal by the image reader unit 101. The image reader unit 101 includes a lens, a CCD, which is a photoelectric conversion element, a driving circuit for the CCD, and so on. The image signal output from the image reader unit 101 is subjected to various kinds of correction processing performed by an image processing unit 112 that includes hardware devices such as an ASIC, and is thereafter output to the image forming apparatus main body 301.

Document reading modes of the reader apparatus 202 include a flow reading mode and a fixed mode. In the flow reading mode, an image on a document is read while the document is being conveyed at a constant speed, while the illumination system 209 and the optical system are stopped. In the fixed mode, a document is placed on the document glass platen 214 of the reader apparatus 202, and an image on the document placed on the document glass platen 214 is read while the illumination system 209 and the optical system are moved at a constant speed. Usually, a document in the shape of a sheet is read in the flow reading mode, and a bound document is read in the fixed mode.

The image forming apparatus 100 has a copying function, which is the function of forming images on recording sheets (recording materials) in units of pages, using the image forming apparatus main body 301, based on image signals output from the reader apparatus 202. Note that the image forming apparatus 100 also has a printing function, which is the function of forming images on recording sheets based on data received from an external device via a network.

An image signal output from the reader apparatus 202 is input to an optical scanning apparatus 311. The optical scanning apparatus 311 includes a semiconductor laser and a polygon mirror, and outputs a laser beam (an optical signal) that has been modulated based on the input image signal from the semiconductor laser. The surface of a photosensitive drum 309 is irradiated with the laser beam that has been output from the semiconductor laser and has been reflected by the polygon mirror and the mirrors 312 and 313, and thus the photosensitive drum 309 is exposed. The photosensitive drum 309 whose surface has been uniformly charged by a charger 310 is exposed by the laser beam, and thus an electrostatic latent image is formed on the photosensitive drum 309. The electrostatic latent image formed on the photosensitive drum 309 is developed using toner supplied from a developer 314, and thus a toner image is formed on the photosensitive drum 309. The toner image on the photosensitive drum 309 is moved to a position (a transfer position) that is opposed to a transfer separator 315 as the photosensitive drum 309 rotates, and is thereafter transferred to a recording sheet by the transfer separator 315.

Recording sheets are housed within paper cassettes 302 and 304 that are capable of housing different types of recording sheets. For example, the paper cassette 302 houses normal recording sheets, and the paper cassette 304 houses tab sheets. A recording sheet housed in the paper cassette 302 is fed onto a conveyance path by a paper feed roller 303, is conveyed to the position of a registration roller 308 by a conveyance roller 306, and is temporarily stopped at this position. A recording sheet housed in the paper cassette 304 is fed onto a conveyance path by a paper feed roller 305, is conveyed to the position of the registration roller 308 by the conveyance rollers 307 and 306, and is temporarily stopped at this position.

The recording sheet that has been conveyed to the position of the registration roller 308 is conveyed by the registration roller 308 to the transfer position in synchronization with the timing with which the toner image on the photosensitive drum 309 reaches the transfer position. The sheet of recording paper onto which the toner image has been transferred from the photosensitive drum 309 at the transfer position is conveyed by a conveyance belt 317 to a fixing device 318. The fixing device 318 fixes an image on a sheet of recording paper to the sheet by applying heat and pressure.

If image formation is performed in a single-side printing mode, the sheet of recording paper that has passed through the fixing device 318 is discharged to the outside of the apparatus by discharge rollers 319 and 324. If image formation is performed in a double-side printing mode, the recording sheet that has passed through the fixing device 318, on a top surface (a first surface) of which an image has been formed, is conveyed to a reverse path 325 by the discharge roller 319, the conveyance roller 320, and a reverse roller 321. Furthermore, immediately after the trailing edge of the recording sheet has passed through the meeting point of the reverse path 325 and a double-side path 326, the rotation of the reverse roller 321 is reversed, and thus the recording sheet starts to be conveyed in the opposite direction, to the double-side path 326. Thereafter, the recording sheet is conveyed along the double-side path 326 by conveyance rollers 322 and 323, is conveyed to the position of the registration roller 308 again by the conveyance roller 306, and is temporarily stopped at this position. Furthermore, as with the case of image formation on the top surface (the first surface) of the recording sheet, transfer of a toner image onto a rear surface (a second surface) of the recording sheet is performed at the transfer position, and fixing is performed by the fixing device 318, and thereafter the recording sheet is discharged to the outside of the apparatus.

In the case of turning over the recording sheet having the top surface to which an image has been formed (such that the first surface faces downward) and discharging the recording sheet to the outside of the apparatus, the recording sheet that has passed through the fixing device 318 is temporarily conveyed in the direction toward the conveyance roller 320, instead of in the direction toward the discharge roller 324. Thereafter, immediately before the trailing edge of the recording sheet passes through the position of the conveyance roller 320, the rotation of the conveyance roller 320 is reversed, and thus the recording sheet starts to be conveyed in the opposite direction and is conveyed in the direction toward the discharge roller 324. Consequently, the recording sheet in the turned-over state is discharged to the outside of the apparatus by the discharge roller 324.

As described above, the image forming apparatus main body 301 includes the conveyance rollers 306 and 307, the discharge roller 319, the reverse roller 321, the conveyance rollers 322 and 323, and the discharge roller 324 as rollers for conveying recording sheets on which images are to be formed. Rollers such as the paper feed roller 303 and the registration roller 308 are also rollers for conveying recording sheets. As described below, driving control for the motor that drives these rollers is performed by a motor control unit 157 (FIG. 2) according to an instruction from a system controller 151 (FIG. 2).

<Control Configuration of Image Forming Apparatus>

Figure 2:
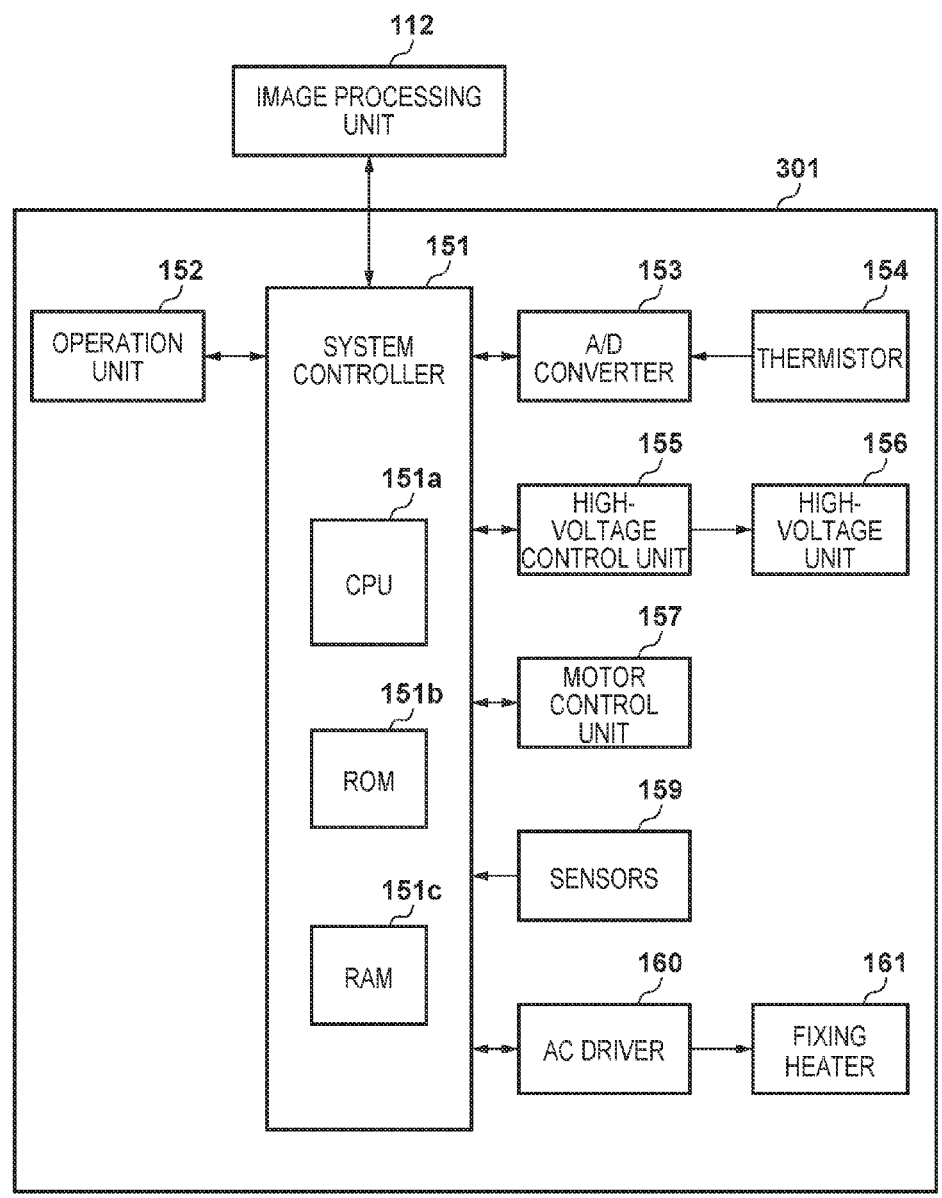
FIG. 2 is a block diagram showing an example of a control configuration of the image forming apparatus.

FIG. 2 is a block diagram showing an example of a control configuration of the image forming apparatus 100. The system controller 151 shown in FIG. 2 includes a CPU 151a, a ROM 151b, and a RAM 151c, and controls the entirety of the image forming apparatus 100. The system controller 151 is connected to the image processing unit 112, an operation unit 152, an analogue/digital (A/D) converter 153, a high-voltage control unit 155, the motor control unit 157, sensors 159, and an AC driver 160. The system controller 151 is capable of exchanging data with each of the units connected thereto.

The CPU 151a executes various sequences related to a predetermined image forming sequence by reading and executing various programs stored in the ROM 151b. The RAM 151c is a storage device, and is used as a work area for executing various programs, or a temporary storage area for temporarily storing various kinds of data. The RAM 151c stores, for example, data such as a setting value for the high-voltage control unit 155, a designated value for the motor control unit 157, and information received from the operation unit 152.

The system controller 151 controls the operation unit 152 so that an operation screen, from which the user performs various kinds of setting, is displayed on a display unit provided in the operation unit 152, and thus receives settings made by the user via the operation unit 152. The system controller 151 receives, from the operation unit 152, information indicating the content of settings (a setting value for a magnification ratio for copying, a density setting value, etc.) input by the user via the operation unit 152. In addition, the system controller 151 transmits, to the operation unit 152, data for notifying the user of the state of the image forming apparatus. The operation unit 152 displays information indicating the state of the image forming apparatus (e.g. the number of sheets on which image formation is to be performed, information indicating whether or not image formation is being performed, and information indicating the occurrence of a jam and the position where the jam occurred) on the display unit based on data received from the system controller 151.

The system controller 151 (CPU 151a) transmits setting value data for each device in the image forming apparatus 100 to the image processing unit 112. The setting value data is required by the image processing unit 112 to perform image processing. In addition, the system controller 151 receives signals from each device (signals from the sensors 159), and controls the high-voltage control unit 155 based on the received signals. The high-voltage control unit 155 supplies, to the charger 310, the developer 314, and the transfer separator 315, which constitute a high-voltage unit 156, a voltage required for their operation, based on setting values output from the system controller 151.

The A/D converter 153 receives a detection signal from a thermistor 154 for detecting the temperature of a fixing heater 161, converts the detection signal into a digital signal, and transmits the digital signal to the system controller 151. The system controller 151 controls the AC driver 160 based on the digital signal received from the A/D converter 153, thereby controlling the temperature of the fixing heater 161 such that the fixing heater 161 has a desired temperature for fixing. Note that the fixing heater 161 is a heater that is included in the fixing device 318 and is used for fixing.

As described above, the system controller 151 controls the operation sequences of the image forming apparatus 100. In addition, the system controller 151 controls the driving sequences of the motors using the motor control unit 157. The motor control unit 157 controls a motor (a stepping motor 509 shown in FIG. 3) that serves as a driving source that drives a roller for conveying recording sheets, according to instructions from the system controller 151. Note that the image forming apparatus 100 includes, for each of the motors corresponding to the respective rollers for conveying recording sheets, the motor control unit 157 that controls the motor. In the present embodiment, the motor control unit 157 is an example of a motor control apparatus that performs driving control for a motor.

The system controller 151 (the CPU 151*a*) that serves as a master controller of the motor control unit 157 generates a designated value (designated position) θ_ref that indicates the target position of the rotor of the motor (the stepping motor 509) that is to be controlled, and outputs the designated position θ_ref to the motor control unit 157. For example, the designated position θ_ref is a pulsed square-wave signal, and one pulse defines the minimum amount of change in the rotation angle of the stepping motor. Note that a designated value (designated speed) ω_ref that indicates the target speed of the rotor of the motor can be obtained as a frequency corresponding to the designated position θ_ref. The CPU 151*a*, upon starting the driving sequence of the motor, outputs the generated designated position θ_ref to the motor control unit 157 in cycles having a predetermined period of time (the control period). The motor control unit 157 executes the position control and the speed control for the motor (the stepping motor 509) according to the designated positions provided from the CPU 151*a*.

<Vector Control>

Figure 3:
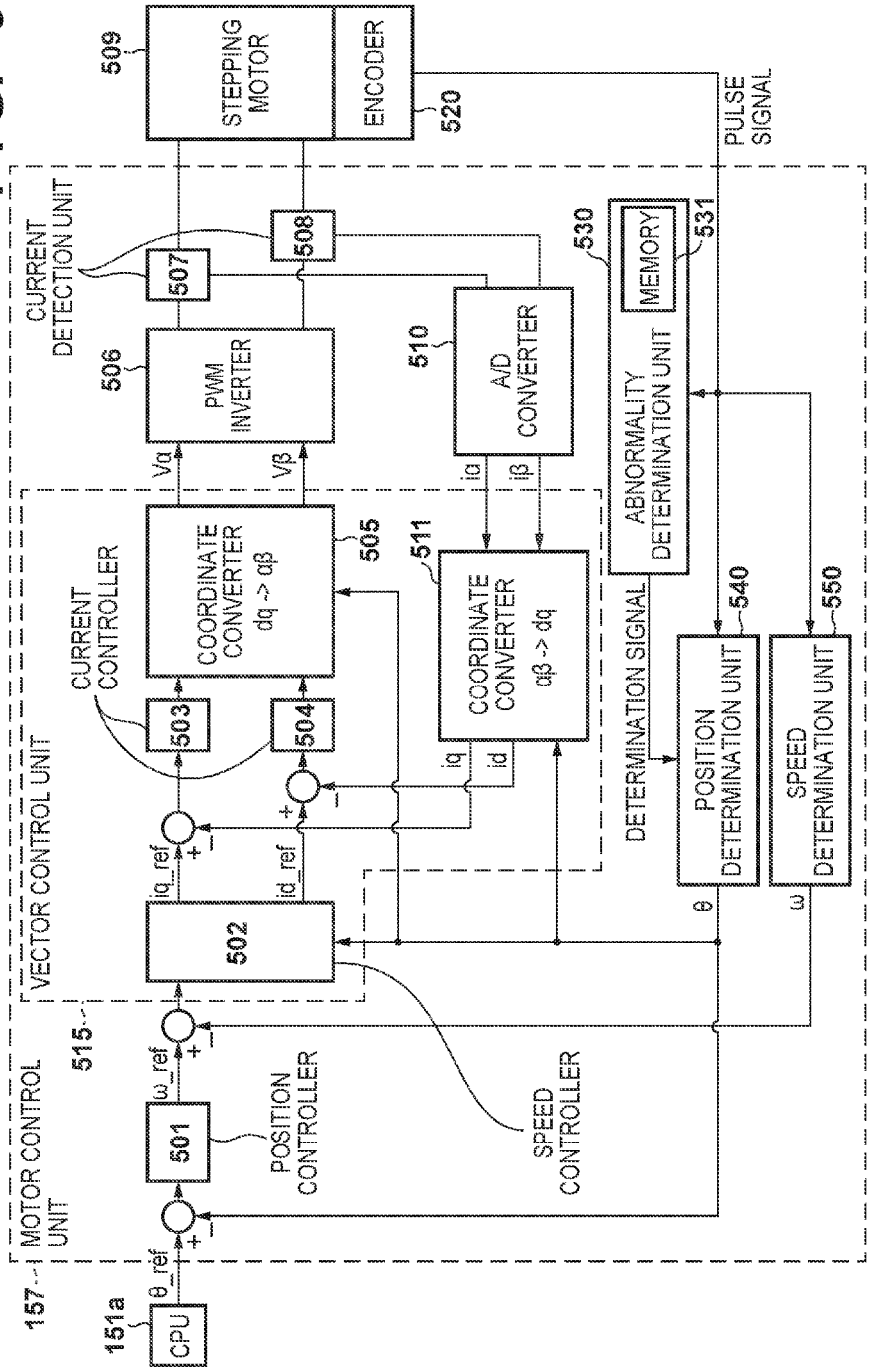
FIG. 3 is a block diagram showing an example of a configuration of a motor control unit.
Figure 4:
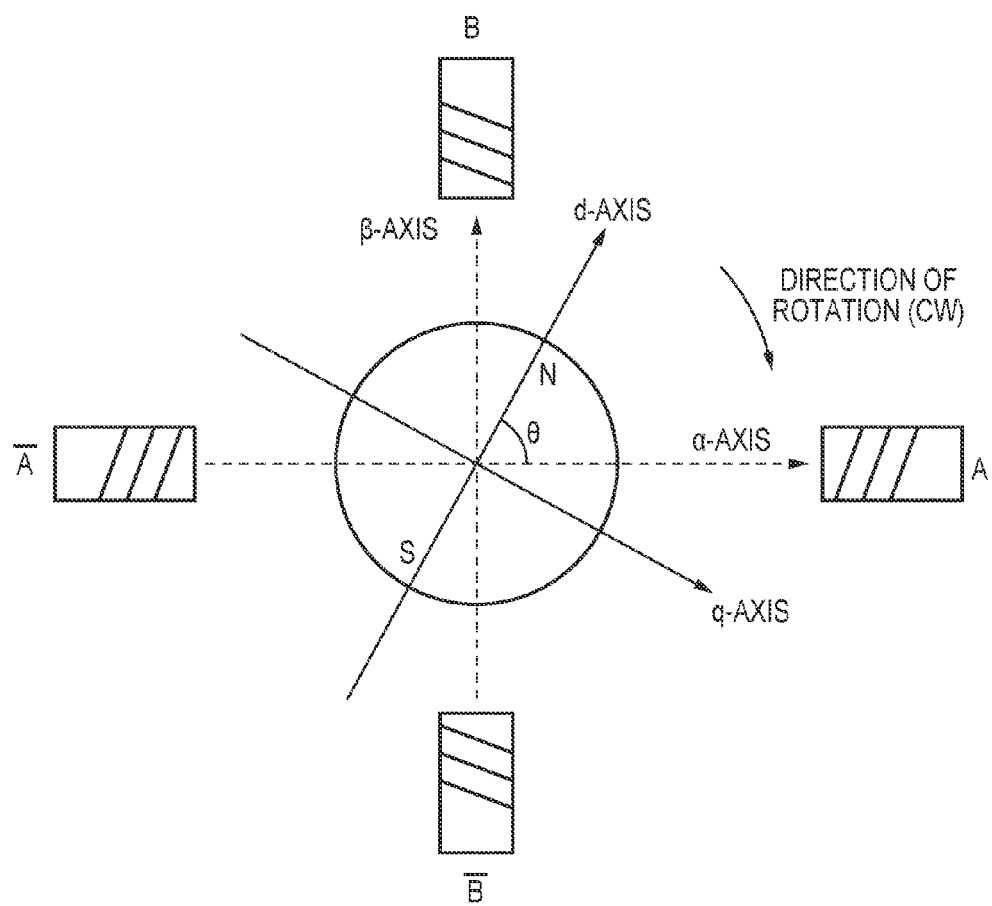
FIG. 4 is a diagram showing a relationship between a motor and d- and q-axes of a rotating coordinate system.

Next, with reference to FIGS. 3 and 4, a description is given of an overview of vector control that is executed by the motor control unit 157. FIG. 3 is a block diagram showing an example of a configuration of the motor control unit 157 according to the present embodiment. Note that the stepping motor 509 is a motor having at least two phases. In the present embodiment, the stepping motor 509 is a two-phase motor having an A-phase and a B-phase.

A PWM inverter 506 of the motor control unit 157 supplies driving current to the windings of the stepping motor 509 according to driving voltages Vα and Vβ output from a vector control unit 515, and thus the motor control unit 157 drives the stepping motor 509. Note that the vector control unit 515 includes a speed controller 502, current controllers 503 and 504, and coordinate converters 505 and 511 as shown in FIG. 3.

Here, FIG. 4 is a diagram showing a relationship between the two-phase motor having the A-phase and the B-phase and the d-axis and the q-axis of the rotating coordinate system. In the drawing, the axis corresponding to the A-phase winding and the axis corresponding to the B-phase winding in a stationary coordinate system are defined as an α-axis and a β-axis. Also, the angle formed by the a-axis of the stationary coordinate system and the direction of the magnetic flux (d-axis) generated by the magnetic poles of a permanent magnet used as the rotor is defined as an angle θ. In this case, the position (the rotational position) of the rotor of the stepping motor 509 is represented as the angle θ. In vector control, as shown in FIG. 4, the rotating coordinate system defined with the position θ of the rotor of the stepping motor 509 as a reference is used. The rotating coordinate system is represented using the d-axis, which extends along the direction of magnetic flux of the rotor, and the q-axis, which extends along the direction that is advanced from the d-axis by 90 degrees (the axis that is orthogonal to the d-axis).

The motor control unit 157 performs vector control for controlling the driving currents to be supplied to the windings of the stepping motor 509, by controlling current values in the rotating coordinate system defined with the position θ of the rotor of the stepping motor 509 as a reference. In vector control, a current vector corresponding to the driving currents that flow through the A-phase winding and the B-phase winding of the stepping motor 509 is converted from a vector in the stationary coordinate system represented by the α-axis and the β-axis into a vector in the rotating coordinate system represented by the d-axis and the q-axis. As a result of such a coordinate conversion, the driving current supplied to the stepping motor 509 is represented by the direct current d-axis component (the d-axis current) and the direct current q-axis component (the q-axis current) in the rotating coordinate system. In this case, the q-axis current corresponds to the torque current component that generates torque in the stepping motor 509, and the d-axis current corresponds to the excitation current component that affects the magnetic flux strength of the rotor of the stepping motor 509. The motor control unit 157 executes vector control for the stepping motor 509 by controlling the q-axis current and the d-axis current in the rotating coordinate system independently of each other.

Specifically, the motor control unit 157 determines the position and the rotation speed of the rotor of the stepping motor 509, and performs vector control based on the result of determination. Note that in the motor control unit 157 shown in FIG. 3, the position θ of the rotor of the stepping motor 509 is determined by a position determination unit 540. The rotation speed ω is determined by a speed determination unit 550.

In the present embodiment, an encoder 520, which serves as a position detection sensor, is provided in the stepping motor 509. The encoder 520 outputs a pulse signal corresponding to the displacement of the position of the rotor of the stepping motor 509 to an abnormality determination unit 530, the position determination unit 540, and the speed determination unit 550.

The position determination unit 540 determines the position θ of the rotor of the stepping motor 509 based on the pulse signal output from the encoder 520. The abnormality determination unit 530 outputs, to the position determination unit 540, a determination signal that indicates whether or not there is an abnormality in the pulse signal output from the encoder 520. The position determination unit 540 corrects the determined position θ based on the determination signal, and outputs the corrected position θ to a position controller 501. The speed determination unit 550 determines the rotation speed ω of the rotor of the stepping motor 509 based on the pulse signal output from the encoder 520. The rotation speed ω determined by the speed determination unit 550 is output to the speed controller 502.

The outermost control loop, which includes the position controller 501, controls the position of the rotor of the stepping motor 509 based on the position θ of the rotor of the stepping motor 509 output from the position determination unit 540. The designated position θ_ref output from the CPU 151a is input to the motor control unit 157. The position controller 501 generates and outputs the designated speed ω_ref such that the deviation between the position θ of the rotor of the stepping motor 509 output from the position determination unit 540 and the designated position θ_ref approaches 0. Thus, the position controller 501 controls the position of the rotor of the stepping motor 509.

In the control loop that includes the speed controller 502, the speed of the rotor of the stepping motor 509 is controlled based on the rotation speed co of the rotor of the stepping motor 509 output from the speed determination unit 550. The speed controller 502 generates and outputs current designated values iq_ref and id_ref such that the deviation between the rotation speed ω of the rotor of the stepping motor 509 output from the speed determination unit 550 and the designated speed ω_ref approaches 0. Note that the current designated values iq_ref and id_ref are current designated values in the rotating coordinate system.

The driving currents that flow through the windings for the respective phases of the stepping motor 509 are detected by current detection units 507 and 508, and are converted from analogue values to digital values by an A/D converter 510. The driving currents, which are digital values converted from analogue values by the A/D converter 510, can be represented as current values iα and iβ in the stationary coordinate system, by the following equations (1) using the position θ of the rotor of the stepping motor 509.

$$i\alpha = I^* \cos\theta$$

$$i\beta = I^* \sin\theta \quad (1)$$

These current values iα and iβ are input to the coordinate converter 511.

The current values iα and iβ are subjected to coordinate conversion (Clarke conversion) performed by the coordinate converter 511, and are thus converted into a current value iq of the q-axis current and a current value id of the d-axis current in the rotating coordinate system, using the following equations (2).

$$id = \cos\theta^* i\alpha + \sin\theta^* i\beta$$

$$iq = -\sin\theta^* i\alpha + \cos\theta^* i\beta \quad (2)$$

Note that the q-axis current is the torque current component (a first current component) that causes the stepping motor 509 to generate torque. The d-axis current is the excitation current component (a second current component) that affects the magnetic flux strength of the rotor of the stepping motor 509, and does not contribute to the generation of torque of the stepping motor 509.

The coordinate converter 511 converts the current values iα and iβ in the stationary coordinate system (the α- and β-axes) into the current values iq and id in the rotating coordinate system (the d- and q-axes) using the equations (2), and outputs the current values iq and id. A difference value between the current value iq output from the coordinate converter 511 and the current designated value iq_ref output from the speed controller 502 is input to the current controller 503. A difference value between the current value id output from the coordinate converter 511 and current designated value id_ref output from the speed controller 502 is input to the current controller 504. The current controllers 503 and 504 generate and output current values iq' and id' in the rotating coordinate system such that the input difference value approaches to 0. Note that each of the position controller 501, the speed controller 502, and the current controllers 503 and 504 is, for example, constituted by a proportional compensator and an integral compensator, and realizes feedback control by performing PI control.

The coordinate converter 505 reversely converts the current values iq' and id' in the rotating coordinate system, output from the current controllers 503 and 504, into current values iα' and iβ in the stationary coordinate system, using the following equations.

$$i\alpha' = \cos\theta^* id' - \sin\theta^* iq'$$

$$i\beta' = \sin\theta^* id' + \cos\theta^* iq' \quad (3)$$

The coordinate converter 505 outputs driving voltages Vα and Vβ, that are based on the current values iα' and iβ' resulting from the conversion into the stationary coordinate system, to the PWM inverter 506 that is constituted by a full-bridge circuit.

The vector control unit 515 thus performs vector control for controlling the driving currents to be supplied to the windings for the respective phases of the stepping motor 509, by controlling the current values in the rotating coordinate system (the d- and q-axes) defined with the position θ of the rotor of the stepping motor 509 as a reference. Note that vector control is usually performed such that the value of the d-axis current, which is a current component that does not contribute to the generation of torque of the stepping motor 509, becomes 0. In other words, the vector control unit 515 sets the current designated value id_ref to 0, but this is not essential.

In the PWM inverter 506, the full-bridge circuit is driven by the driving voltages Vα and Vβ input from the coordinate converter 505. Consequently, the PWM inverter 506 drives the stepping motor 509 by supplying driving currents to the windings for the respective phases of the stepping motor 509 in accordance with the driving voltages Vα and Vβ. As described above, in the present embodiment, the vector control unit 515 and the PWM inverter 506 function as an example of a motor driving unit.

Figure 5:
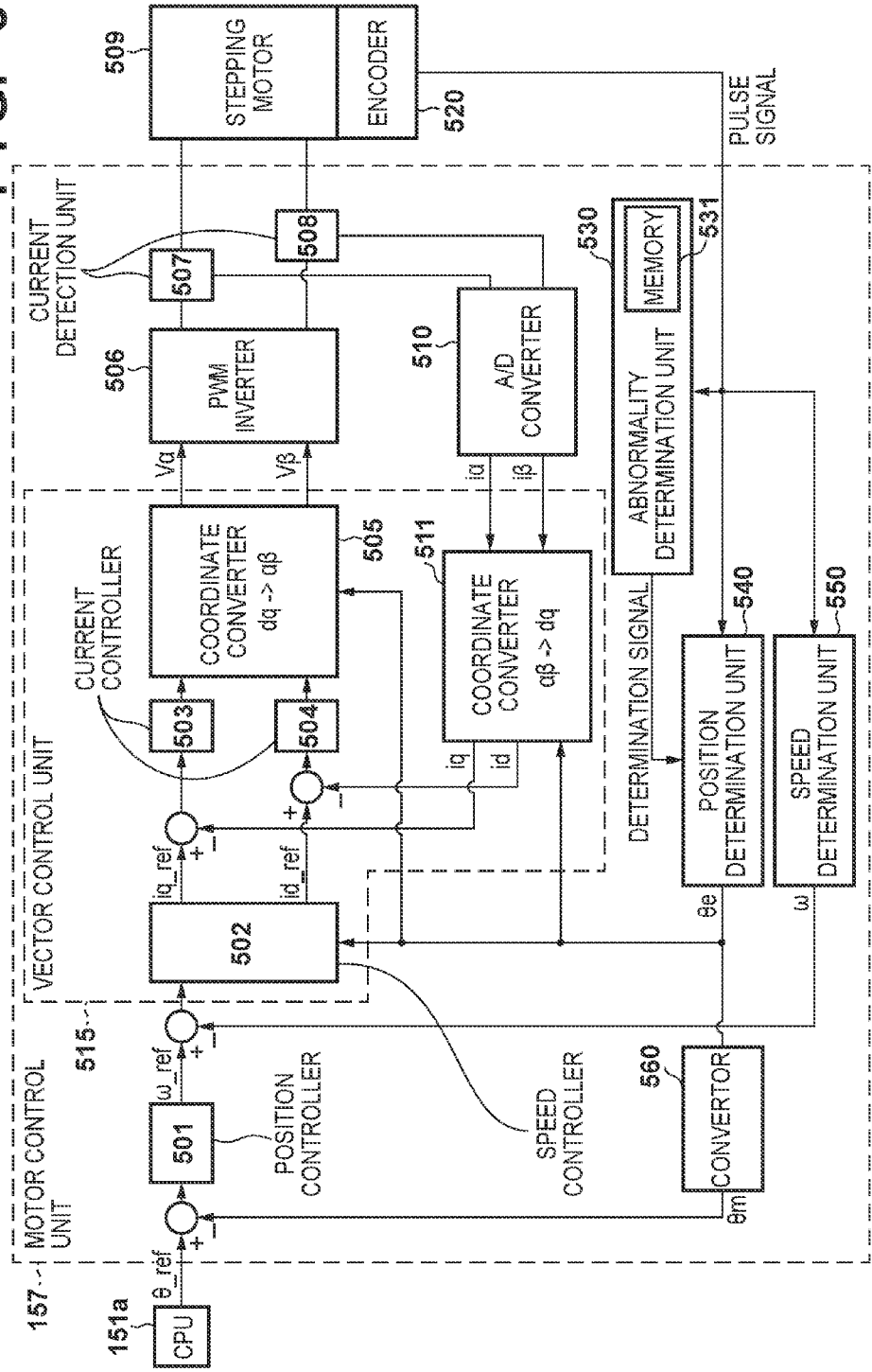
FIG. 5 is a block diagram showing a modification of a configuration of the motor control unit.

In the present embodiment, the actual rotational position (the mechanical angle) and the determined rotational position (the electrical angle) of the rotor of the stepping motor 509 are in one-to-one correspondence, but this is not essential. For example, if the actual rotational position (the mechanical angle) and the determined rotational position (the electrical angle) of the rotor of the stepping motor 509 are not in one-to-one correspondence, a convertor 560 that converts an electrical angle θe into a mechanical angle θm may be provided between the position determination unit 540 and the position controller 501 as shown in FIG. 5.

<Position Detection Unit>

Figure 6:
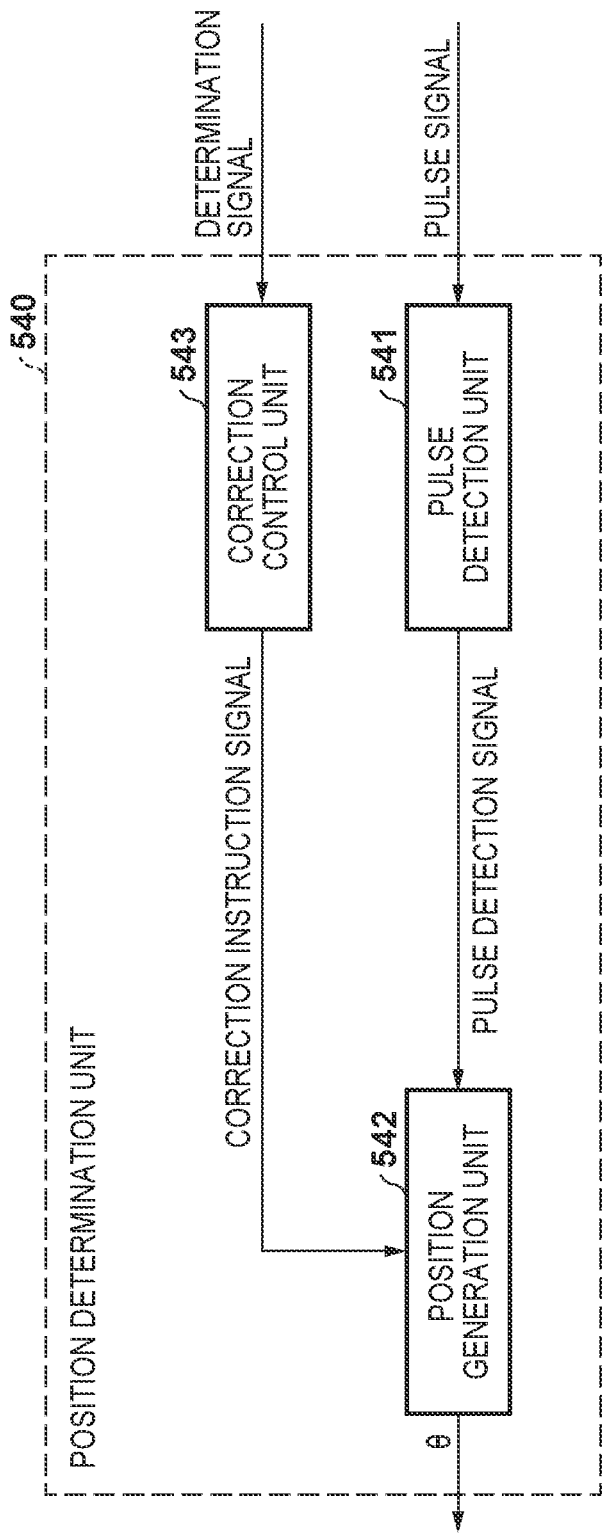
FIG. 6 is a block diagram showing an example of a configuration of a position detection unit.

FIG. 6 is a block diagram showing an example of a configuration of the position determination unit 540 shown in FIG. 3. The position determination unit 540 includes a pulse detection unit 541, a position generation unit 542, and a correction control unit 543. A pulse signal output from the encoder 520 is input to the pulse detection unit 541. A determination signal that is output from the abnormality determination unit 530 and indicates whether or not there is an abnormality in the pulse signal is input to the correction control unit 543.

The pulse detection unit 541 detects a pulse from the pulse signal output from the encoder 520. Upon detecting a pulse from the pulse signal, the pulse detection unit 541 outputs, to the position generation unit 542, a pulse detection signal indicating that a pulse has been detected.

The position generation unit 542 counts pulses of the pulse signal output from the encoder 520. Specifically, the position generation unit 542 updates the count value each time a pulse detection signal is output from the pulse detection unit 541, thereby counting pulses of the pulse signal output from the encoder 520. This count value corresponds to the position θ of the rotor of the stepping motor 509 as described below. The position generation unit 542 generates the position θ based on the count value. The position θ generated by the position generation unit 542 is fed back to the position controller 501, the speed controller 502, and the coordinate converters 505 and 511, and is used in vector control.

If the determination signal output from the abnormality determination unit 530 indicates that there is an abnormality in the pulse signal output from the encoder 520, the correction control unit 543 outputs, to the position generation unit 542, a correction instruction signal that makes an instruction to execute processing to correct the position θ.

<Error in Position of Rotor of Stepping Motor>

In the present embodiment, the encoder 520, which serves as a position detection sensor, is attached to the stepping motor 509. The encoder 520 is an optical rotary encoder having a predetermined resolution, and outputs a pulse corresponding to a change in the position of the rotor of the stepping motor 509.

Figure 7A:
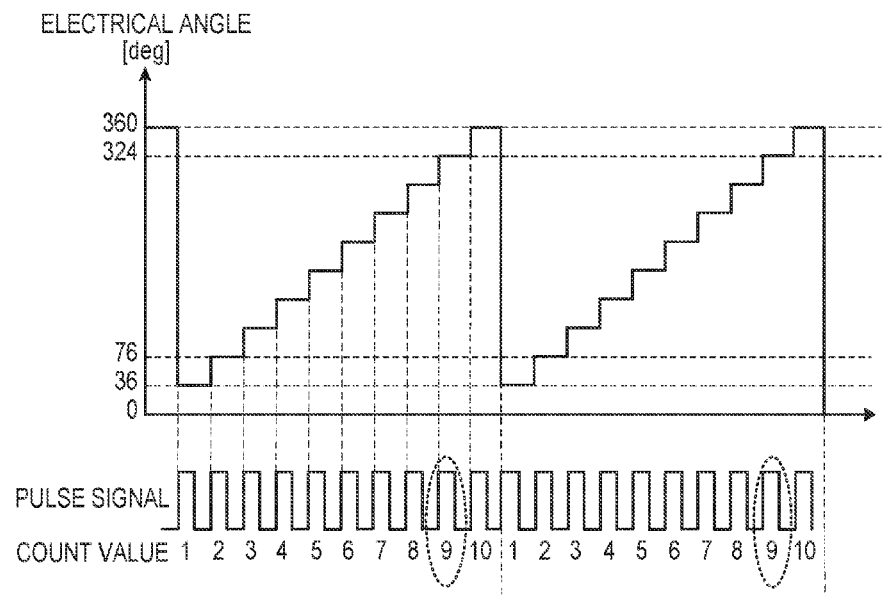
FIGS. 7A and 7B are diagrams showing a relationship between a pulse signal output from an encoder and an electrical angle of a stepping motor detected based on the pulse signal.
Figure 7B:
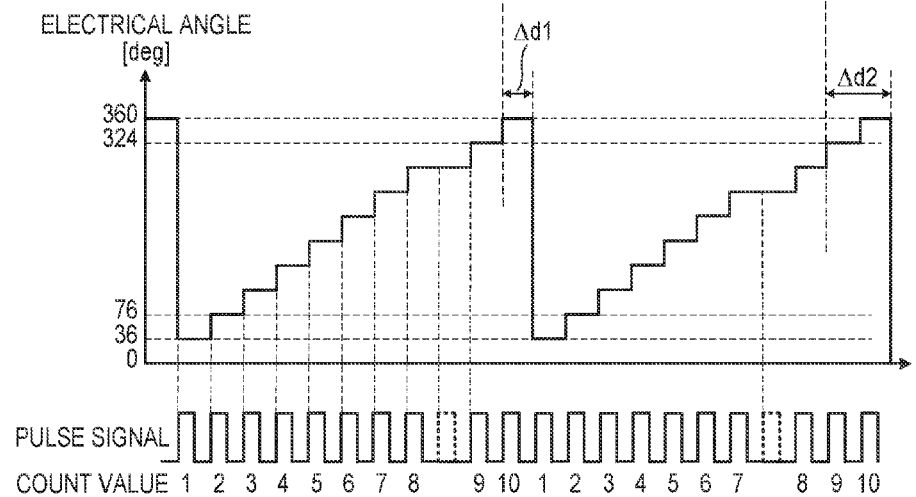

Here, FIGS. 7A and 7B are diagrams showing an example of the relationship between the pulse signal output from the encoder 520 and the electrical angle (position θ) of the stepping motor 509 detected based on the pulse signal. FIG. 7A shows the pulse signal and the electrical angle in the case where there is no abnormality in the pulse signal. FIG. 7B shows the pulse signal and the electrical angle in the case where there is an abnormality in the pulse signal. FIGS. 7A and 7B show, as an example, a case where the number of pulses output from the encoder 520 in one rotation of the rotation shaft of the stepping motor 509 (the resolution) is ten. In this case, the amount of change in the position θ corresponding to a single pulse output from the encoder 520 is 36°. FIGS. 7A and 7B also show the count values obtained by counting the number of pulses included in the pulse signal output from the encoder 520 (i.e. the count value held by the position generation unit 542 shown in FIG. 6). The position generation unit 542 resets the count value when the count value reaches ten.

The position generation unit 542 generates the electrical angle (the position θ) based on the count value. As described above, the amount of change in the position θ corresponding to a single pulse output from the encoder 520 is 36°. Therefore, as shown in FIG. 7A, the position generation unit 542 increases the electrical angle by 36° each time the pulse detection signal is output from the pulse detection unit 541 (i.e. each time the count value is increased by one). In this way, if there is no abnormality in the pulse signal output from the encoder 520, the position generation unit 542 generates the position θ of the rotor of the stepping motor 509 with an accuracy that depends on the resolution of the encoder or the like, by counting the number of pulses included in the pulse signal.

However, as described above, if the encoder 520 becomes dirty or is damaged, a pulse might be missing from the pulse signal output from the encoder 520. FIG. 7B shows an example in which the 9$^{th}$ pulse (enclosed by a circle) of the pulse signal shown in FIG. 7A is missing and the pulse detection unit 541 cannot detect the pulse. Due to such a missing pulse, when the stepping motor 509 has rotated once, the electrical angle shown in FIG. 7B has an error of one pulse (Δd1) relative to the electrical angle shown in FIG. 7A. When the stepping motor 509 has rotated twice, the electrical angle shown in FIG. 7B has an error of two pulses (Δd2) relative to the electrical angle shown in FIG. 7A. In this way, due to missing pulses being continuously unable to be detected, an error in the position θ accumulates each time the stepping motor 509 rotates.

An error may also occur due to noise being added to the pulse signal output from the encoder 520. If noise is added to the pulse signal, there is the possibility of the pulse detection unit 541 detecting not only the pulses output from the encoder 520, but also the noise as an extra pulse. Specifically, an extra pulse is added to the pulse signal output from the encoder 520, and due to the detection of such an extra pulse, an error occurs in the position θ determined by the position determination unit 540.

If an error occurs in the position of the rotor of the stepping motor 509 determined by the position determination unit 540 in this way, the stability of the rotation speed of the rotor of the stepping motor 509 controlled by performing vector control degrades. Furthermore, if such an error is accumulated, the stepping motor 509 enters an uncontrollable state. Therefore, it is necessary to make it possible to continue vector control for the stepping motor 509 even if an abnormality occurs in the output signal from the encoder 520.

In the present embodiment, in order to continue vector control for the stepping motor 509 even if an abnormality occurs in the output signal from the encoder 520, the position determination unit 540 corrects the position θ when there is an abnormality in the pulse signal output from the encoder 520. Specifically, the abnormality determination unit 530 determines whether or not there is an abnormality in a pulse signal output from the encoder 520. If there is an abnormality in a pulse signal output from the encoder 520, the position determination unit 540 corrects the position θ of the rotor of the stepping motor 509. In the following, more specific examples of processing performed by the abnormality determination unit 530 and the position determination unit 540 are described.

Example 1

The abnormality determination unit 530 according to Example 1 determines whether or not there is an abnormality in a pulse signal, based on a time interval between pulses included in the pulse signal output from the encoder 520. Specifically, if the time interval between the pulses included in the pulse signal output from the encoder 520 has increased or decreased by a predetermined amount or more, the abnormality determination unit 530 determines that there is an abnormality in the pulse signal. On the other hand, if the time interval between the pulses included in the pulse signal output from the encoder 520 has not increased or decreased by the predetermined amount or more, the abnormality determination unit 530 determines that there is no abnormality in the pulse signal. The abnormality determination unit 530 outputs, to the correction control unit 543, a determination signal that indicates whether or not there is an abnormality in the pulse signal. Note that this determination signal includes information indicating whether the abnormality in the pulse signal is that a pulse is missing or an extra pulse has been added.

If the determination signal is a signal indicating that there is an abnormality in the pulse signal output from the encoder 520, the correction control unit 543 outputs a correction instruction signal to the position generation unit 542. The position generation unit 542 corrects the position θ of the rotor of the stepping motor 509 based on the correction instruction signal. Specifically, if the abnormality in the pulse signal is that a pulse is missing, the position generation unit 542 corrects the position θ by adding a positional displacement amount corresponding to one pulse to the position θ. If the abnormality in the pulse signal is that an extra pulse has been added, the position generation unit 542 ignores (does not add) the positional displacement amount corresponding to one pulse.

Abnormality Determination Processing

Figure 8A:
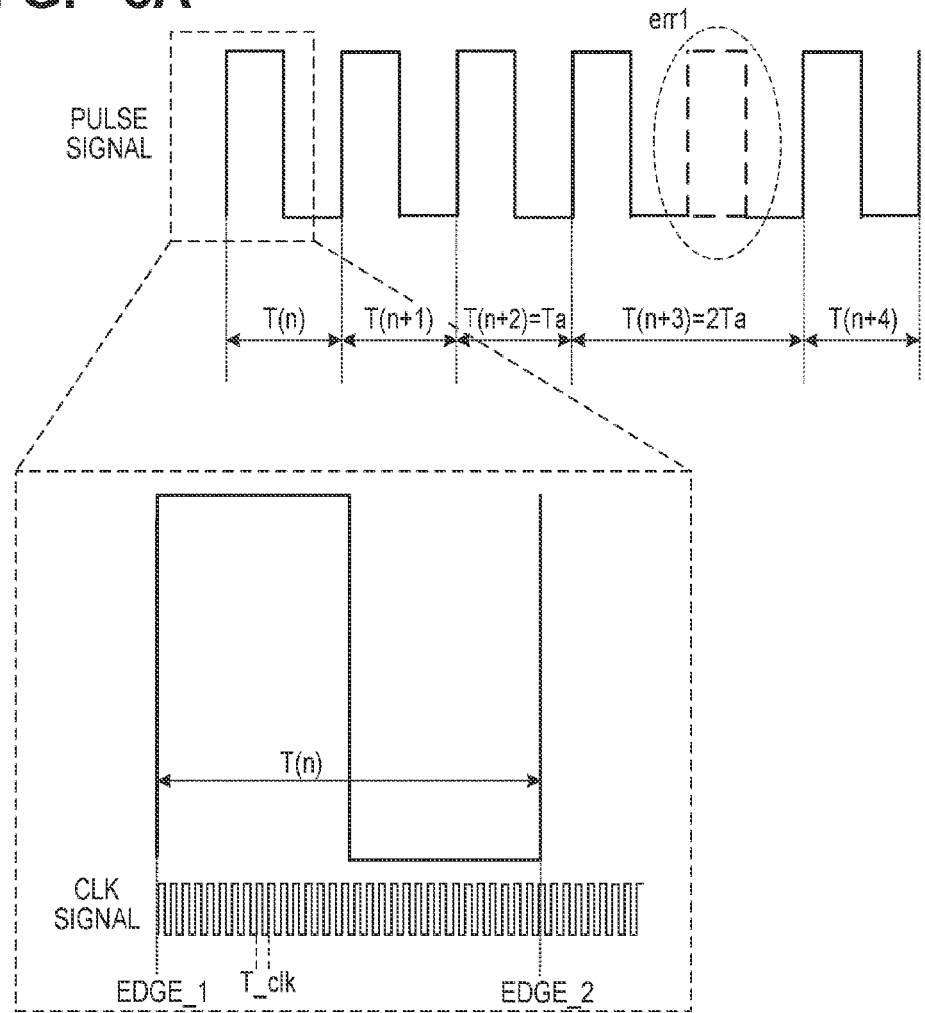
FIGS. 8A and 8B are diagrams showing an example in which an abnormality occurs in a pulse signal output from the encoder.
Figure 8B:
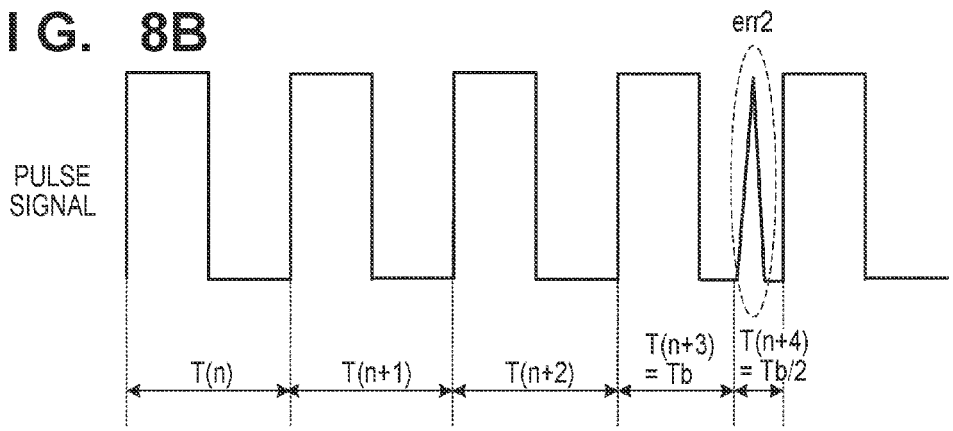

First, with reference to FIGS. 8A and 8B, a description is given of an example of abnormality determination processing that is executed by the abnormality determination unit 530. FIG. 8A is a diagram showing an example in which a pulse is missing from the pulse signal output from the encoder 520. The missing pulse is indicated by "err1". In this case, the pulse detection unit 541 cannot detect the missing pulse. FIG. 8B is a diagram showing an example in which noise has been added to the pulse signal output from the encoder 520. The addition of noise is indicated by "err2". In this case, the pulse detection unit 541 misdetects the noise as a pulse signal.

As shown in FIG. 8A, the abnormality determination unit 530 measures the time intervals T(n), T(n+1), T(n+2), T(n+3), T(n+4) . . . between the pulses included in the pulse signal output from the encoder 520 (i.e. the time intervals between the rising edges of the pules). It is possible to measure the time intervals by using the clock (CLK) signal that is output from the CPU 151a and has a period (T_clk) that is sufficiently shorter than the period of the pulse signal from the encoder 520, as shown in the enlarged drawing in FIG. 8A. The abnormality determination unit 530 measures the time intervals between the pulses by counting the number of clock signal pulses between the rising edges (EDGE_1, EDGE_2) of two adjacent pulses in the pulse signal output from the encoder 520. Note that the time intervals are measured using normal pulses as a reference.

The abnormality determination unit 530 determines that there is an abnormality in the pulse signal, upon detecting that the time interval obtained by the latest measurement has increased by a first predetermined amount or more from the time interval between normal pulses obtained by the measurement before the latest measurement (the previous measurement). The abnormality determination unit 530 also determines that there is an abnormality in the pulse signal, upon detecting that the time interval obtained by the latest measurement has decreased by a second predetermined amount or more from the time interval between normal pulses obtained by the previous measurement. The first predetermined amount and the second predetermined amount used as references for determination have been set in advance with consideration of the acceleration rate and the deceleration rate in the driving sequence of the stepping motor 509 that is to be controlled, the above-described resolution of the encoder 520, and so on.

More specifically, the abnormality determination unit 530 determines that a pulse is missing from the pulse signal output from the encoder 520 if the time interval between pulses obtained by the latest measurement has increased to be, for example, 150% or more of the time interval between normal pulses obtained by the previous measurement (the time interval has increased by the first predetermined amount or more). In the example shown in FIG. 8A, the time interval T(n+3) (=2Ta) is greater than 150% of the time interval T(n+2) (=Ta) between normal pulses, due to the missing pulse indicated by "err1". In this case, the abnormality determination unit 530 determines that there is an abnormality in the pulse signal (a pulse is missing from the pulse signal).

On the other hand, the abnormality determination unit 530 determines that an extra pulse has been added to the pulse signal output from the encoder 520 if the time interval between pulses obtained by the latest measurement has decreased to be, for example, 90% or less (has decreased by the second predetermined amount or more) from the time interval between normal pulses obtained by the previous measurement. With reference to FIG. 8B, the following describes a method for determining that there is an abnormality in the pulse signal (an extra pulse has been added to the pulse signal).

In the example shown in FIG. 8B, the time interval T(n+3) (=Tb) is smaller than 90% of the time interval T(n+2) (=3/2*Tb) between normal pulses obtained by the previous measurement. Therefore, the abnormality determination unit 530 determines that there is an abnormality in the pulse signal (an extra pulse has been added to the pulse signal). As described above, the time intervals are measured using normal pulses as a reference. Therefore, after performing the determination, the abnormality determination unit 530 compares the sum of the time interval T(n+3) (=Tb) and the time interval T(n+4) (=Tb/2) with the time interval T(n+2) (=3/2*Tb) between normal pulses obtained by the previous measurement. The sum of the time interval T(n+3) (=Tb) and the time interval T(n+4) (=Tb/2) is not smaller than 90% of the time interval T(n+2) (=3/2*Tb). Therefore, the abnormality determination unit 530 determines that the pulse signal is normal. Note that the abnormality determination unit 530 has a memory 531 that stores the results of the previous measurement and the results of the measurement before the previous measurement, in association with the results of the latest measurement.

Position Correction Processing

Figure 9A:
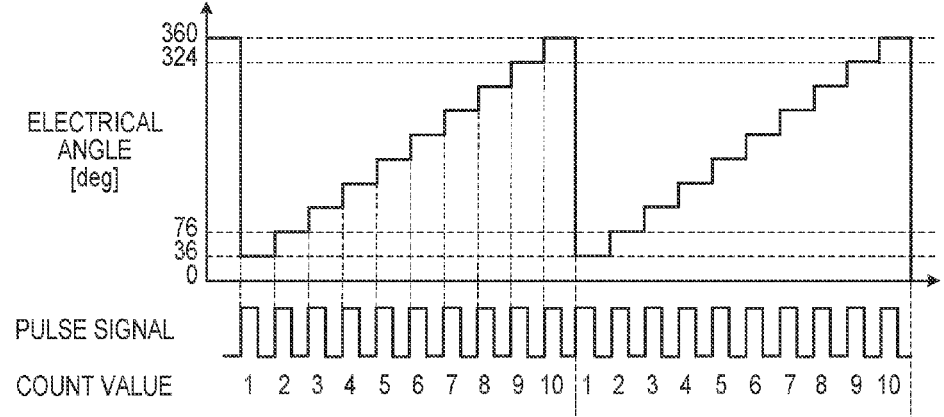
FIGS. 9A to 9C are diagrams showing a relationship between a pulse signal output from the encoder and an electrical angle of a stepping motor detected based on the pulse signal.
Figure 9B:
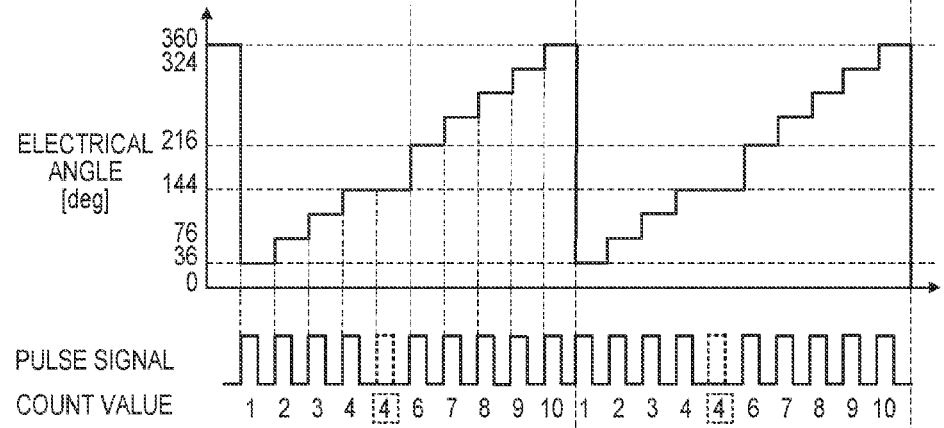
Figure 9C:
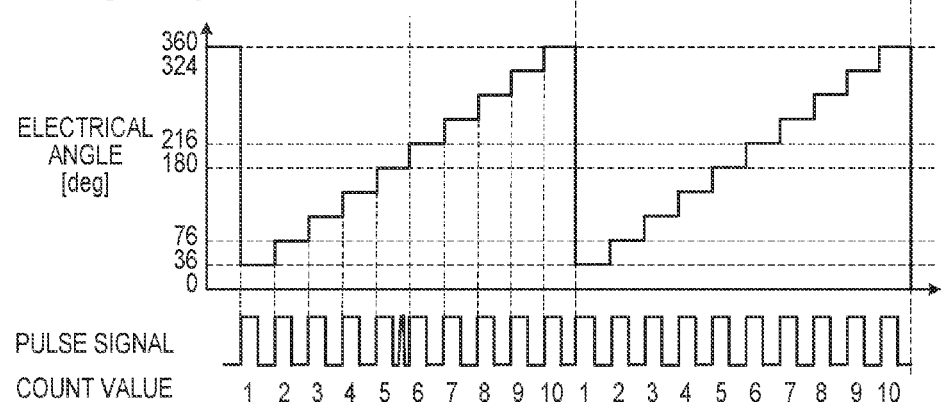

Next, with reference to FIGS. 9A to 9C, a description is given of an example of position correction processing executed by the position generation unit 542 based on the correction instruction signal output from the correction control unit 543. FIGS. 9A to 9C are diagrams showing an example of a relationship between a pulse signal output from the encoder 520 and the electrical angle (the position θ) of the stepping motor 509 generated by the position generation unit 542 based on the pulse signal. FIG. 9A shows a case in which the pulse signal includes no abnormality, and FIGS. 9B and 9C show a case in which the pulse signal includes an abnormality. In FIGS. 9A to 9C, as in FIGS. 7A and 7B, a case where the number of pulses output from the encoder 520 in one rotation of the rotation shaft of the stepping motor 509 (the resolution) is ten, and the count value obtained based on the pulse signal is also shown. The position generation unit 542 updates the count value based on a pulse detection signal that is output by the pulse detection unit 541 upon detecting a pulse.

(When there is No Abnormality in Pulse Signal)

If the determination signal output from the abnormality determination unit 530 indicates that there is no abnormality in the pulse signal output from the encoder 520, the correction control unit 543 does not output the correction instruction signal to the position generation unit 542. If this is the case, as shown in FIG. 9A, the position generation unit 542 generates the electrical angle corresponding to the count value as the position θ, and does not correct the position θ.

(When there is Abnormality in Pulse Signal)

If the determination signal output from the abnormality determination unit 530 indicates that there is an abnormality in the pulse signal output from the encoder 520, the correction control unit 543 outputs the correction instruction signal to the position generation unit 542. FIG. 9B shows an example of position correction processing executed by the position generation unit 542 based on the correction instruction signal in the case where the abnormality in the pulse signal is that a pulse is missing. FIG. 9C shows an example of position correction processing executed by the position generation unit 542 based on the correction instruction signal in the case where the abnormality of the pulse signal is that an extra pulse has been added.

In the pulse signal shown in FIG. 9B, the pulse corresponding to the count value "5" is missing. In this case, the pulse detection unit 541 cannot detect the missing pulse. Therefore, the pulse detection signal is not output to the position generation unit 542. In other words, the count value is not updated from 4 to 5 by the position generation unit 542, and the position θ of the rotor of the stepping motor 509 is also not updated. Specifically, the count value "4" and the detection value "144°" are maintained.

When the abnormality determination unit 530 detects the pulse subsequent to the pulse corresponding to the count value "4", the abnormality determination unit 530 determines that there is an abnormality in the pulse signal (a pulse is missing) by performing the above-described determination processing based on the time intervals between pulses, and outputs the determination signal indicating the results of determination. The correction control unit 543 outputs the correction instruction signal to the position generation unit 542 based on the determination signal. The position generation unit 542 performs position correction processing based on the correction instruction signal.

The position generation unit 542 corrects the position θ by adding the amount of change in the position corresponding to one pulse output from the encoder 520 (36° in this example) to the position θ, based on the correction instruction signal. In the present example, it is possible to realize such a correction of detection value by increasing the count value held in the position generation unit 542 by one.

In the example shown in FIG. 9B, the position generation unit 542 increases the count value by two based on the pulse detection signal indicating that the pulse detection unit 541 has detected the pulse that is subsequent to the pulse corresponding to the count value "4". Note that out of the increment of two made by the position generation unit 542 to the count value, the increment of one is made to correct the position θ. (i.e. the count value is updated from 4 to 6). Consequently, the position θ generated by the position generation unit 542 is changed from 144° to 216° (+72°), not to 180° (+36°). This means that the amount of a positional change corresponding to one pulse has been added to the position θ, and thus the position θ has been corrected.

As seen from a comparison of FIG. 9B with FIG. 9A, there is a temporal error between the position θ in the case where there is no abnormality in the pulse signal and the position θ in the case where there is an abnormality in the pulse signal, due to the missing pulse in the pulse signal. However, the above-described position correction processing based on the result of determination by the abnormality determination unit 530 compensates the error. In this way, the position generation unit 542 compensates an error that occurs in the position θ due to a missing pulse, by adding the amount of a positional change corresponding to one pulse to the position θ obtained based on the detection of pulses included in the pulse signal. Therefore, an error that occurred in the position θ generated by the position generation unit 542 will not accumulate as the rotor of the stepping motor 509 rotates.

In the case of the pulse signal shown in FIG. 9C, noise follows the pulse corresponding to the count value "5", and consequently an extra pulse is added. In this case, the pulse detection unit 541 detects the extra pulse, and outputs a pulse detection signal to the position generation unit 542. The abnormality determination unit 530, upon determining the extra pulse, determines that there is an abnormality in the pulse signal (the extra pulse has been added) by performing the above-described determination processing based on the time intervals of the pulses, and outputs a determination signal indicating the result of determination to the correction control unit 543. The correction control unit 543 outputs, to the position generation unit 542, a correction instruction signal that makes an instruction not to update the count value, based on the determination signal. Consequently, the position generation unit 542 does not update the count value. Therefore, the position θ of the rotor of the stepping motor 509 is also not updated. Consequently, it is possible to prevent the position generation unit 542 from updating the position θ of the rotor of the stepping motor 509 due to the pulse detection unit 541 detecting an extra pulse and outputting a pulse detection signal to the position generation unit 542. In other words, it is possible to prevent an error from occurring in the position θ of the rotor determined by the position determination unit 540, due to an extra pulse. Therefore, as in the example shown in FIG. 9B, an error that occurred in the position θ generated by the position generation unit 542 will not accumulate as the rotor of the stepping motor 509 rotates.

<Process of Control Executed by Motor Control Unit>

Figure 10:
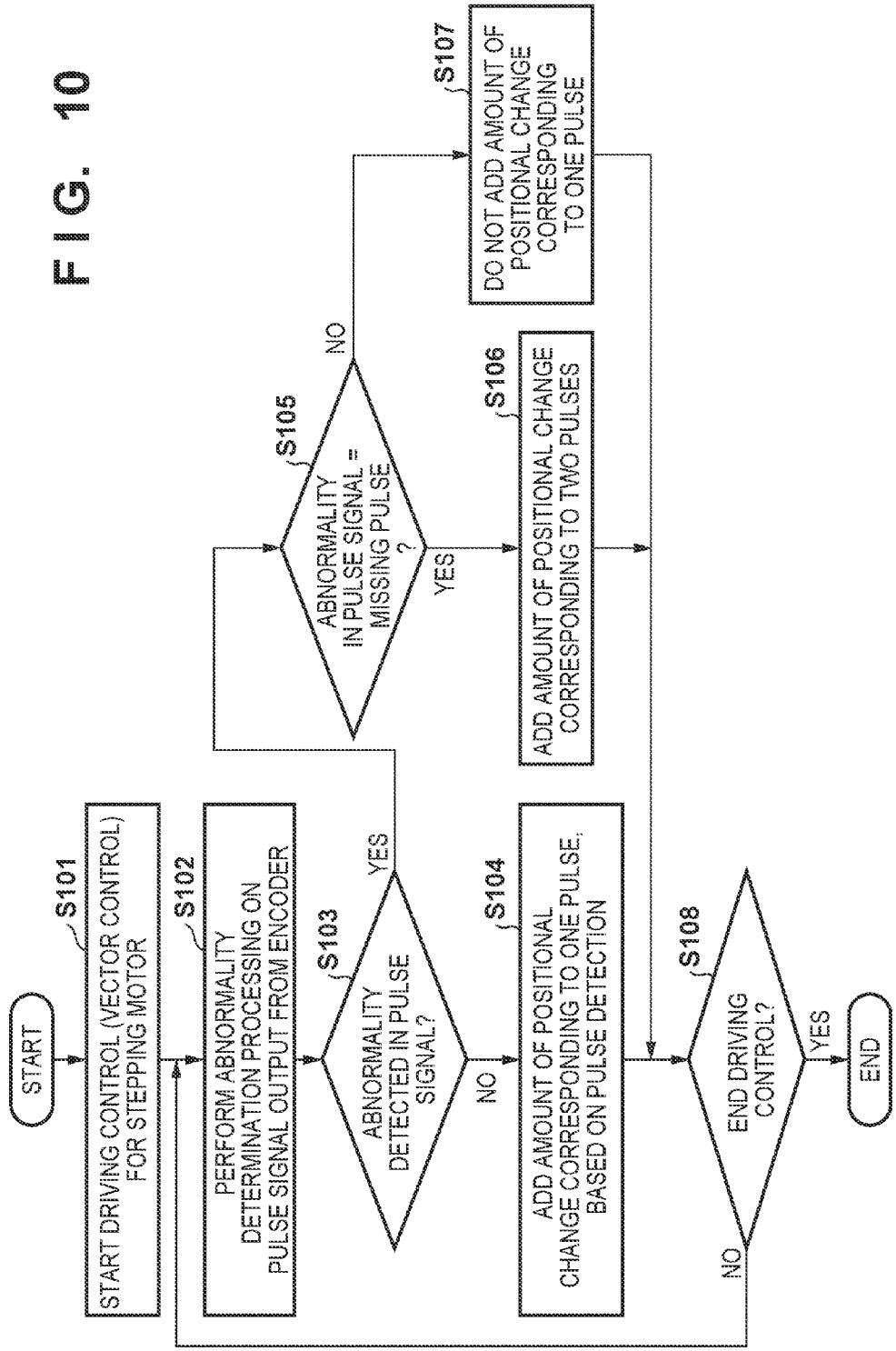
FIG. 10 is a flowchart showing a process of control executed by the motor control unit.

FIG. 10 is a flowchart showing a process of control executed by the motor control unit 157. With reference to FIG. 10, the following describes a method by which the motor control unit 157 according to the present example controls the stepping motor 509.

In step S101, the motor control unit 157 starts driving control for the stepping motor 509 by using vector control as described above, according to an instruction from the CPU 151a. For example, when starting the execution of a print job in the image forming apparatus 100, the CPU 151a causes the motor control unit 157 to start driving control for the stepping motor 509.

Next, in step S102, as described with reference to FIGS. 8A and 8B, the abnormality determination unit 530 executes abnormality determination processing for the pulse signal output from the encoder 520.

If no abnormality is found in the pulse signal in step S103, the position generation unit 542 generates the position θ in step S104 based on the pulse detection signal. Thereafter, the motor control unit 157 proceeds to step S108.

If an abnormality is found in the pulse signal in step S103, the motor control unit 157 proceeds to step S105.

In step S105, if the abnormality in the pulse signal is that a pulse is missing, the motor control unit 157 proceeds to step S106. In S106, the position generation unit 542 generates a corrected position θ by adding the amount of a positional change corresponding to two pulses to the position θ, as described above. Thereafter, the motor control unit 157 proceeds to step S108.

In step S105, if the abnormality in the pulse signal is not a missing pulse but that an extra pulse has been added, the motor control unit 157 proceeds to step S107. In step S107, the position generation unit 542 does not add the amount of a positional change corresponding to one pulse to the position θ, as described above. Thereafter, the motor control unit 157 proceeds to step S108.

Thereafter, in step S108, the motor control unit 157 ends or maintains vector control for the stepping motor 509, based on an instruction from the CPU 151a. The motor control unit 157 returns to step S102 unless vector control is to be ended, and repeats steps S102 to S107. Note that, as described above, the position θ generated by the position generation unit 542 is fed back to the position controller 501, the speed controller 502, and the coordinate converters 505 and 511, and is used in vector control for the stepping motor 509.

As described above, in the present example, the abnormality determination unit 530 determines whether or not there is an abnormality in a pulse signal output from the encoder 520. If it is determined that there is an abnormality in a pulse signal output from the encoder 520, the position generation unit 542 generates (corrects) the position θ to compensate the error occurred due to the abnormality in the pulse signal. Specifically, the position generation unit 542 generates the position θ that can be obtained based on the detection of pulses included in the pulse signal, according to whether the abnormality in the pulse signal is that a pulse is missing or that an extra pulse has been added.

In the present example, even if a pulse is missing, it is possible to correct the position θ that has an error due to the missing pulse, to a correct value. Thus, it is possible to prevent an error in the position θ from accumulating as the rotor of the stepping motor 509 rotates. Also, even if an extra pulse is added, it is possible to prevent an error from occurring in the position θ of the rotor determined by the position determination unit 540, due to the extra pulse. Thus, it is possible to prevent an error in the position θ from accumulating as the rotor of the stepping motor 509 rotates. Therefore, according to the present example, it is possible to allow the motor control unit 157 to continuously perform vector control. As a result, it is possible to realize efficient motor driving control using vector control without bringing the stepping motor 509 into an uncontrollable state.

Note that in the present example, a description has been given of a case where the resolution of the encoder 520 is ten pulses, but the resolution of the encoder 520 may have any value (e.g. 1000 pulses).

Example 2

In Example 2, a description is given of a case in which the abnormality determination unit 530 performs abnormality determination processing different from that in Example 1 (in step S102 in FIG. 10). In Example 2, unlike in Example 1, it is assumed that a plurality of pulse signals are output from the encoder 520. The abnormality determination unit 530 in Example 2 performs abnormality determination processing based on pulses included in a first pulse signal and pulses included in a second pulse signal that has a predetermined phase difference from the first pulse signal. In the following, descriptions that are the same as those in Example 1 are omitted for the sake of simplification of description.

FIG. 11 is a diagram showing examples of pulse signals output from the encoder 520 according to the present example. As shown in FIG. 11, the encoder 520 outputs three types of pulse signals (ENC_A, ENC_B, and ENC_Z). The encoder 520 outputs 1000 pulses as the pulse signal A (ENC_A) and 1000 pulses as the pulse signal B (ENC_B) in one rotation of the stepping motor 509. Note that FIG. 11 shows pulse signals output from the encoder 520 while the stepping motor 509 rotates forward, and the phase of the pulse signal A (ENC_A) is advanced by 90° relative to the phase of the pulse signal B (ENC_B). When the stepping motor 509 rotates backward, this phase relationship is reversed, and the phase of the pulse signal A (ENC_A) is retarded by 90° relative to the pulse signal B (ENC_B). The encoder 520 also outputs only one pulse as the pulse signal Z (ENC_Z) in one rotation of the stepping motor 509. Thus, the period of the pulse signal Z (ENC_Z) corresponds to the period of rotation of the rotor of the stepping motor 509.

The abnormality determination unit 530 according to Example 1 realizes abnormality determination processing using the pulse signal A (ENC_A), for example. In contrast, the abnormality determination unit 530 according to the present example executes abnormality processing using the pulse signal A (ENC_A) and the pulse signal B (ENC_B). Specifically, the pulse signal A (ENC_A) and the pulse signal B (ENC_B) have the same period, whereas the pulses of the pulse signal A (ENC_A) output from the encoder 520 always have a phase difference of 90° from the pulses of the pulse signal B (ENC_B). In other words, the pulses of the pulse signal A (ENC_A) and the pulses of the pulse signal B (ENC_B) are always alternatingly output from the encoder 520 (in a regular order) insofar as there is no abnormality in the pulse signals. Thus, if there is no abnormality in the pulse signal output from the encoder 520, the abnormality determination unit 530 alternatingly detects the rising edge of a pulse of the pulse signal A (ENC_A) and the rising edge of a pulse of the pulse signal B (ENC_B).

The abnormality determination unit 530 performs abnormality determination processing based on the order in which the pulses of the pulse signal A (ENC_A) and the pulses of the pulse signal B (ENC_B) are output from the encoder 520. The abnormality determination unit 530 determines that there is an abnormality in a pulse signal output from the encoder 520 if there is a change in the order in which the rising edge of a pulse of the pulse signal A (ENC_A) and the rising edge of a pulse of the pulse signal B (ENC_B) are detected.

In the example shown in FIG. 11, the pulse of the pulse signal B (ENC_B) indicated by "err3" is missing. In this case, the abnormality determination unit 530 successively detects the rising edges (A_R1, A_R2) of two pulses of the pulse signal A (ENC_A). Consequently, the abnormality determination unit 530 determines that there is an abnormality in the pulse signal output from the encoder 520.

Also, in the example shown in FIG. 11, an extra pulse indicated by "err4" caused by the addition of noise has been added to the pulse signal B (ENC_B). In this case, the abnormality determination unit 530 successively detects the rising edges (B_R1, B_R2) of two pulses of the pulse signal B (ENC_B). Consequently, the abnormality determination unit 530 determines that there is an abnormality in the pulse signal output from the encoder 520.

Note that upon determining that there is an abnormality in a pulse signal, the abnormality determination unit 530 can determine whether the abnormality in the pulse signal is that a pulse is missing or that an extra pulse has been added, based on whether the time interval between the two detected rising edges is no smaller than a first threshold value. For example, if the time interval between the rising edges is no smaller than the first threshold value, the abnormality determination unit 530 determines that the abnormality in the pulse signal is that a pulse is missing. If the time interval between the rising edges is smaller than a second threshold value, the abnormality determination unit 530 determines that the abnormality in the pulse signal is that an extra pulse has been added. These threshold values are set in advance with consideration of the acceleration rate and the deceleration rate in the driving sequence of the stepping motor 509 that is to be controlled, the above-described resolution of the encoder 520, and so on.

In the present example, in the case where a plurality of pulse signals are output from the encoder 520, it is possible to realize abnormality determination processing based on the plurality of pulse signals. Note that the method for abnormality determination using ENC_Z will be described in Example 3.

The abnormality determination unit 530 outputs, to the position determination unit 540, a determination signal based on the above-described abnormality determination processing. The method adopted by the position determination unit 540 to determine the position θ is the same as that in Example 1. Thus, the description thereof is omitted.

Example 3

In Example 3, a description is given of a case in which the abnormality determination unit 530 performs abnormality determination processing different from that in Examples 1 and 2 (in step S102 in FIG. 10). In Example 3, as in Example 2, it is assumed that a plurality of pulse signals are output from the encoder 520. The abnormality determination unit 530 according to Example 3 performs abnormality determination processing by using a first pulse signal that corresponds to the positional change of the rotor of the stepping motor 509 and a second pulse signal that corresponds to the rotational period of the rotor of the stepping motor 509. Specifically, the abnormality determination unit 530 performs abnormality determination processing based on the number of pulses of the first pulse signal within the rotational period indicated by the second pulse signal. In the following, descriptions that are the same as those in Examples 1 and 2 are omitted for the sake of simplification of description.

As shown in FIG. 11, the abnormality determination unit 530 uses the pulse signal A (ENC_A) or the pulse signal B (ENC_B), and the pulse signal Z (ENC_Z), to perform abnormality determination processing. The abnormality determination unit 530 detects the rotational period of the rotor of the stepping motor 509 by detecting pulses included in the pulse signal Z output from the encoder 520. Furthermore, the abnormality determination unit 530 counts the number of pulses of either the pulse signal A or the pulse signal B between two adjacent pulses of the pulse signal Z (i.e. the number of pulses included within the rotational period of the rotor of the stepping motor 509). Upon completing the counting of the number of pulses included within the rotational period of the rotor of the stepping motor 509, the abnormality determination unit 530 determines whether or not the number of pulses is equal to a predetermined value. If the number of pulses is not equal to the predetermined value (1000 in this example), the abnormality determination unit 530 determines that there is an abnormality in the pulse signal output from the encoder 520.

Note that it is possible for the abnormality determination unit 530 to determine that the abnormality in the pulse signal is that a pulse is missing if the number of pulses is smaller than the predetermined value, and to determine that the abnormality in the pulse signal is that an extra pulse has been added if the number of pulses is greater than the predetermined value.

The abnormality determination unit 530 outputs, to the position determination unit 540, a determination signal based on the above-described abnormality determination processing. The method adopted by the position determination unit 540 to determine the position θ is the same as that in Example 1. Therefore, the description thereof is omitted.

Thus, it is possible to prevent an error in the position θ from accumulating as the rotor of the stepping motor 509 rotates, by performing the above-described abnormality determination processing and determining the position θ based on the abnormality determination processing.

Other Embodiments

In the above-described embodiment, as shown in FIG. 3, a description has been given of an example in which the abnormality determination unit 530, the position determination unit 540, and the speed determination unit 550 are located within the motor control unit 157. However, the abnormality determination unit 530, the position determination unit 540, and the speed determination unit 550 may be located outside the motor control unit 157. For example, processing executed by the abnormality determination unit 530, the position determination unit 540, and the speed determination unit 550 may be realized as processing executed by the CPU 151a. If this is the case, it is possible to realize vector control of the motor control unit 157 by inputting the position θ and the rotation speed ω generated by the CPU 151a to the motor control unit 157, and the same advantage as in the above-described embodiment can be achieved.

In the above-described embodiment, a description has been given of an example in which the stepping motor is the target to be controlled by the motor control unit 157. However, the above-described embodiment is applicable to the case in which vector control is used for controlling the driving of a motor of a type other than the stepping motor type (e.g. a brushless DC motor for driving the photosensitive drum 309). In such a case, the same advantageous effects as the above-described embodiment can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-204673, filed Oct. 16, 2015 and No. 2016-174003, filed Sep. 6, 2016, which are hereby incorporated by reference herein in their entirety.

What is claimed is:

1. A motor control apparatus that controls a driving current flowing in each of windings of a motor based on a designated position indicating a target position of a rotor of the motor, comprising:

a counter configured to count a number of pulse signals that are output from a position detection sensor, which is provided in the motor, according to a change in a rotational position of the rotor;

a position determiner configured to determine the rotational position of the rotor based on a count value of the counter;

a controller configured to control the driving current flowing in each of the windings of the motor based on both a value of a torque current component and a value of an excitation current component so that a difference between the designated position and the rotational position determined by the position determiner is decreased, the torque current component being a current component that has a current value represented in a rotating coordinate system based on the rotational position and generates torque in the rotor, and the excitation current component being a current component that has a current value represented in the rotating coordinate system based on the rotational position and affects an intensity of a magnetic flux penetrating each of the windings of the motor; and a discriminator configured to discriminate whether or not a time interval between two consecutive pulses among the pulse signals output from the position detection sensor is abnormal, wherein the counter is configured to, if the time interval is discriminated to be abnormal, correct the count value.

2. The motor control apparatus according to claim 1, wherein the discriminator is configured to discriminate that the time interval is abnormal if the time interval changes by an amount that is greater than or equal to a predetermined amount.

3. The motor control apparatus according to claim 2, wherein the discriminator is configured to:
measure the time interval;
discriminate that a first pulse error in which a pulse is missing from the pulse signals has occurred if the time interval obtained by the measurement is greater than the time interval obtained by the previous measurement by an amount that is greater than or equal to a first predetermined amount; and
discriminate that a second pulse error in which an extra pulse is added to the pulse signals has occurred if the time interval obtained by the measurement is smaller than the time interval obtained by the previous measurement by an amount that is greater than or equal to a second predetermined amount.

4. The motor control apparatus according to claim 3, wherein the counter is configured to:
correct the count value by adding a value corresponding to one pulse to the count value if the first pulse error has occurred; and
not add the value corresponding to one pulse to the rotational position if the second pulse error has occurred.

5. The motor control apparatus according to claim 1, wherein the pulse signals include first pulse signals and second pulse signals that have a predetermined phase difference relative to the first pulse signals, and
the discriminator is configured to discriminate whether or not the time interval is abnormal based on an order of pulses included in the first pulse signals and the second pulse signals that are output from the position detection sensor.

6. The motor control apparatus according to claim 5, wherein the discriminator is configured to discriminate that the time interval is normal if the discriminator detects a pulse included in the first pulse signals and thereafter detects a pulse included in the second pulse signals, or detects a pulse included in the second pulse signals and thereafter detects a pulse included in the first pulse signals, and
the discriminator is configured to discriminate that the time interval is abnormal if the discriminator detects a pulse included in the first pulse signals and thereafter detects another pulse included in the first pulse signals, or detects a pulse included in the second pulse signals and thereafter detects another pulse included in the second pulse signals.

7. The motor control apparatus according to claim 6, wherein the discriminator is further configured to discriminate that the abnormality in the time interval is a first pulse error in which a pulse is missing if a time interval between the two detected pulses is greater than or equal to a first threshold value, and discriminate that the abnormality in the time interval is a second pulse error in which an extra pulse has been added if the time interval between the two detected pulses is smaller than a second threshold value.

8. The motor control apparatus according to claim 1, wherein the pulse signals include first pulse signals that correspond to a change in the rotational position of the rotor and second pulse signals that include pulses that correspond to a rotational period of the rotor, and
the discriminator is configured to discriminate whether or not the time interval is abnormal based on the number of pulses included in the first pulse signals within the rotational period indicated by the second pulse signals.

9. The motor control apparatus according to claim 8, wherein the discriminator is configured to discriminate that the abnormality in the time interval is a first pulse error in which a pulse is missing if the number of pulses included in the first pulse signals within the rotational period indicated by the second pulse signals is smaller than a predetermined value, and discriminate that the abnormality in the time interval is a second pulse error in which an extra pulse has been added if the number of pulses included in the first pulse signals within the rotational period indicated by the second pulse signals is no smaller than the predetermined value.

10. The motor control apparatus according to claim 1, wherein the controller is configured to control the driving current flowing in each of windings of the motor by controlling the value of the torque current component while controlling the value of the excitation current component to be 0.

11. The motor control apparatus according to claim 1, wherein the controller is configured to include:
a voltage generator configured to generate a driving voltage that has a value corresponding to a value of driving current that is to be supplied to the winding of the motor; and
a current provider configured to drive the motor by supplying, to the winding of the motor, the driving current in accordance with the driving voltage generated by the voltage generator.

12. The motor control apparatus according to claim 1, wherein the position detection sensor is a rotary encoder, and
the discriminator is configured to discriminate that the time interval between two consecutive pulses among the pulse signals output from the rotary encoder is abnormal if the time interval is not a time interval corresponding to a resolution of the rotary encoder.

13. The motor control apparatus according to claim 1, wherein the designated position is provided to the motor control apparatus from a master controller that provides a motor driving command to the motor control apparatus.

14. The motor control apparatus according to claim 1, wherein the time interval becomes longer than a first threshold in a case where a pulse is missing from the pulse signals, and the time interval becomes shorter than a second threshold in a case where an extra pulse is added to the pulse signals.

15. An image forming apparatus comprising:

an image forming unit configured to form an image on a recording material;

a motor having a rotor and windings and configured to drive a roller that conveys the recording material;

a counter configured to count a number of pulse signals that are output from a position detection sensor, which is provided in the motor, according to a change in a rotational position of the rotor;

a position determiner configured to determine the rotational position of the rotor based on a count value of the counter;

a controller configured to control driving current flowing in each of the windings of the motor based on both a value of a torque current component and a value of an excitation current component so that a difference between the designated position and the rotational position determined by the position determiner is decreased, the torque current component being a current component that has a current value represented in a rotating coordinate system based on the rotational position, and generates torque in the rotor, and the excitation current component being a current component that has a current value represented in the rotating coordinate system based on the rotational position, and affects an intensity of a magnetic flux penetrating each of the windings of the motor; and a discriminator configured to discriminate whether or not a time interval between two consecutive pulses among the pulse signals output from the position detection sensor is abnormal, wherein the counter is configured to, if the time interval is discriminated to be abnormal, correct the count value.

* * * * *